US008771881B2

(12) United States Patent
Kim et al.

(10) Patent No.: US 8,771,881 B2
(45) Date of Patent: Jul. 8, 2014

(54) ELECTROLYTE FOR LITHIUM ION SECONDARY BATTERY AND LITHIUM ION SECONDARY BATTERY COMPRISING THE SAME

(75) Inventors: Jinsung Kim, Yongin-si (KR); Narae Park, Yongin-si (KR); Jinhyunk Lim, Yongin-si (KR); Suhee Han, Yongin-si (KR); Jinbum Kim, Yongin-si (KR); Jungkang Oh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 12/255,799

(22) Filed: Oct. 22, 2008

(65) Prior Publication Data
US 2009/0291370 A1 Nov. 26, 2009

(30) Foreign Application Priority Data
May 21, 2008 (KR) .................. 2008-47026

(51) Int. Cl.
H01M 6/18 (2006.01)
(52) U.S. Cl.
USPC ........... 429/307; 429/330; 429/331; 429/332; 429/333; 429/334; 429/335; 429/340; 429/199; 429/200; 252/62.2
(58) Field of Classification Search
USPC ......... 429/307, 330, 331, 332, 333, 334, 335, 429/340, 199, 200; 252/62.2
See application file for complete search history.

(56) References Cited

U.S. PATENT DOCUMENTS

| | | | |
|---|---|---|---|
| 5,569,736 A | 10/1996 | Josowicz et al. | |
| 2003/0118914 A1 | 6/2003 | Mori | |
| 2003/0157412 A1* | 8/2003 | Yamaguchi et al. | 429/324 |
| 2003/0175598 A1 | 9/2003 | Otsuki et al. | |
| 2005/0118511 A1 | 6/2005 | Park et al. | |
| 2005/0277027 A1 | 12/2005 | Kim et al. | |
| 2007/0072084 A1 | 3/2007 | Nishie | |
| 2008/0020285 A1 | 1/2008 | Horikawa | |
| 2008/0090153 A1 | 4/2008 | Kim et al. | |
| 2008/0118847 A1 | 5/2008 | Jung et al. | |
| 2008/0241670 A1 | 10/2008 | Kim et al. | |
| 2010/0018034 A1 | 1/2010 | Miyasaka et al. | |

FOREIGN PATENT DOCUMENTS

| | | |
|---|---|---|
| CN | 1452796 A | 10/2003 |
| CN | 1622367 A | 6/2005 |
| EP | 1 329 975 | 7/2003 |
| EP | 2166611 A1 | 3/2010 |
| JP | 2-10666 | 1/1990 |
| JP | 8-22839 | 1/1996 |
| JP | 2001-043867 A | 2/2001 |
| JP | 2001-210365 A | 8/2001 |
| JP | 2005-036690 A | 2/2005 |
| JP | 2005-071978 A | 3/2005 |
| JP | 2005-116306 A | 4/2005 |
| JP | 2005-116424 A | 4/2005 |
| JP | 2005-347240 A | 12/2005 |
| JP | 2006-024380 | 1/2006 |
| JP | 2006-024380 A | 1/2006 |
| JP | 2006-261093 | 9/2006 |
| JP | 2006-261093 A | 9/2006 |
| JP | 2007-115583 * | 5/2007 |
| JP | 2007-115583 A | 5/2007 |
| JP | 2007-153868 A | 6/2007 |
| JP | 2007-207439 | 8/2007 |
| JP | 2008053211 A | 3/2008 |
| KR | 10-2003-0051620 A | 6/2003 |
| KR | 10-2003-0052981 A | 6/2003 |
| KR | 10-2005-0041859 A | 5/2005 |
| KR | 10-2007-0082551 A | 8/2007 |
| KR | 10-0814826 B1 | 3/2008 |
| KR | 10-0816208 B1 | 3/2008 |
| KR | 2008-61866 * | 7/2008 |
| WO | WO 02/21631 A1 | 3/2002 |
| WO | WO 2005/036690 A1 | 4/2005 |
| WO | WO 2006/088002 A1 | 8/2006 |
| WO | WO 2008/032657 A1 | 3/2008 |

OTHER PUBLICATIONS

Korean Notice of Allowance issued by the by the KIPO dated Sep. 23, 2011, 5 pages.
Office Action dated Apr. 27, 2013, issued in connection with Chinese Patent Application No. 200910133674.8.
Chinese Office Action issued by the SIPO dated Mar. 7, 2011 corresponding to Chinese Patent Application No. 200910133674.8, 10 pages.
Japanese Office Action issued by the JPO dated Mar. 6, 2012, 3 pages.
Japanese 4th Office Action dated Oct. 22, 2013, issued in connection with corresponding Japanese Patent Application No. 2013-5900.
European Office Action dated Dec. 2, 2013, issued by the European Patent Office, in 9 pages.

* cited by examiner

*Primary Examiner* — Laura Weiner
(74) *Attorney, Agent, or Firm* — Knobbe, Martens, Olson & Bear, LLP

(57) ABSTRACT

An electrolyte for a lithium ion secondary battery includes a non-aqueous organic solvent; a lithium salt; and a phosphonitrile fluoride trimer as an additive, and a lithium ion secondary battery comprising the same. The thickness increase rate of a lithium ion secondary battery including the electrolyte is reduced even when the battery is kept at a high temperature. Thus, the thermal stability and durability of the battery are prominently improved. The durability of the battery can be further improved by including a vinylene carbonate or ethylene carbonate group compound in the electrolyte.

14 Claims, 3 Drawing Sheets

ELECTROLYTE FOR LITHIUM ION SECONDARY BATTERY AND LITHIUM ION SECONDARY BATTERY COMPRISING THE SAME

CROSS-REFERENCE TO RELATED APPLICATIONS

This application claims the benefit of Korean Application No. 2008-47026 filed on May 21, 2008 in the Korean Intellectual Property Office, the disclosure of which is incorporated herein by reference.

BACKGROUND OF THE INVENTION

1. Field of the Invention

Aspects of the present invention relate to an electrolyte for a lithium ion secondary battery and a lithium ion secondary battery comprising the same. More particularly, aspects of the present invention relate to an electrolyte for a lithium ion secondary that can prevent a thickness increase of a lithium ion secondary battery and thus provide improved thermal stability and durability of the battery even when the battery is placed at a high temperature, by containing a phosphonitrile fluoride trimer.

2. Description of the Related Art

A battery is a device that converts the chemical energy of chemical materials inside the battery into electrical energy through an electrochemical oxidation/reduction reaction. Recently, portable devices such as camcorders, cellular phones, notebook computers, PCs and PDAs have been actively developed with rapid progress of the electronic, telecommunication and computer industries. Accordingly, there has been an increased demand for a slim secondary battery of high performance, durability and reliability that can be used in the above portable devices.

Lithium metal has a low weight and standard electrode potential. Accordingly, lithium has very high operation voltage and energy density when it is used as an anode of the battery. However, lithium metal can cause instability of the battery by reacting with an organic solvent to cause an electric short in the battery. Thus, carbon has been developed as an anode material that can substitute for lithium metal. Carbon materials are capable of reversible intercalation and deintercalation of lithium ions because such materials have an electrode potential most similar to the lithium metal and a layered structure. Such a battery is called as a lithium ion battery. The lithium ion battery has been widely used as a secondary battery because it has a high discharge voltage near 4V, excellent energy density per weight and low self-discharge rate.

During initial charging of the lithium battery, lithium ions released from lithium metal composite oxide used as a cathode move to a graphite electrode used as an anode and are inserted into layers of the graphite electrode. At that time, the lithium ions form a kind of a passivation layer on the surface of the graphite anode. The passivation layer is called as an SEI (solid electrolyte interface) film. When the SEI film is formed, the SEI film functions as an ion tunnel to allow only lithium ions to pass through. By the effect of the ion tunnel, molecules of organic solvent having a large molecular weight, which move with the lithium ions in the electrolyte, such as, for example, EC, DMC or DEC are inserted into the graphite anode to prevent degradation of the graphite anode structure. Once the SEI film has been formed, the lithium ions do not react with the graphite anode or other material again. The amount of the lithium ions in the electrolyte is kept reversible and thus stable charge/discharge characteristics are maintained. However, in an angular thin film battery, gases such as $CO$, $CO_2$, $CH_4$, $C_2H_6$ are generated by decomposition of a carbonate group organic solvent during the above SEI formation reaction to cause a problem that the thickness of battery expands during charge. In addition, when the fully charged battery is stored at a high temperature, the SEI film is slowly degraded over time. Accordingly, a sub-reaction, that is, a reaction between the exposed anode surface and the electrolyte around it is continuously generated and the internal pressure of the battery is increased by the continuous generation of gas. As a result, in the case of the angular battery, the thickness of the battery increases. Accordingly, there has been increased desire for an electrolyte that has excellent thermal properties without expansion of the volume when the battery is stored at a high temperature.

In addition, most non-aqueous electrolytic solvents typically have a low withstand voltage. When electrolytes containing solvents having a low withstand voltage are used in the secondary battery, the solvent decomposes upon repetition of charge/discharge cycles and thus gas is generated to cause the increase of the internal pressure of the battery. As a result, the charge/discharge efficiency of the battery is decreased and the lifetime of the battery is shortened by reduction of the energy density of the battery.

To solve the above problems, there have been proposed batteries that improve the thermal property by adding a small amount of certain compounds as an additive in the electrolyte of the lithium secondary battery (See Japanese Patent publications No. 1996-22839 and No. 1990-10666).

SUMMARY OF THE INVENTION

Accordingly, aspects of the present invention provide an electrolyte for a lithium ion secondary battery that can prevent a thickness increase of the battery and thus improve thermal stability and durability of the battery even when the battery is kept at a high temperature.

Additional advantages, aspects and features of the invention will be set forth in part in the description which follows and in part will become apparent to those having ordinary skill in the art upon examination of the following or may be learned from practice of the invention.

According to an embodiment of the present invention, there is provided an electrolyte for a lithium ion secondary battery that includes: a non-aqueous organic solvent; lithium salt; and a phosphonitrile fluoride trimer represented by a chemical formula 1 below as an additive:

[Chemical formula 1]

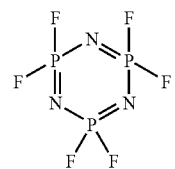

According to an aspect of the present invention, the amount of the phosphonitrile fluoride trimer of the chemical formula 1 may be 0.1 to 5 parts by weight based on 100 parts by weight of the total electrolyte.

According to an aspect of the present invention, the electrolyte for the lithium ion secondary battery may further include at least one selected from the group consisting of vinylene carbonate (VC), propene sultone and a ethylene carbonate group compound represented by a chemical formula 2:

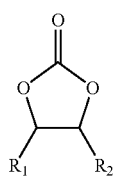

[Chemical formula 2]

where $R_1$ and $R_2$ are respectively selected from the group consisting of hydrogen, a halogen group, a cyano group (CN), a nitro group ($NO_2$), a vinyl group and a fluorinated alkyl group having 1 to 5 carbons, where $R_1$ and $R_2$ are not both hydrogen.)

According to an aspect of the present invention, fluoroethylene carbonate may be used as the ethylene carbonate group compound.

According to an aspect of the present invention, the non-aqueous organic solvent may be at least one selected from the group consisting of carbonate, ester, ether and ketone.

According to an aspect of the present invention, the carbonate may be at least one selected from the group consisting of dimethyl carbonate, diethyl carbonate, dipropyl carbonate, methylpropyl carbonate, ethylpropyl carbonate, ethylmethyl carbonate, ethylene carbonate, propylene carbonate, butylene carbonate and pentylene carbonate.

According to an aspect of the present invention, the ester may be at least one selected from the group consisting of methyl acetate, ethyl acetate, propyl acetate, dimethyl acetate, methyl propionate, ethyl propionate, γ-butyrolactone, decanolide, valerolactone, mevalonolactone and caprolactone.

According to an aspect of the present invention, the ether may be at least one selected from the group consisting of dibutyl ether, tetraglyme, diglyme, dimethoxy ethane, 2-methyltetrahydrofuran and tetrahydrofuran.

According to an aspect of the present invention, the ketone may be at least one selected from the group consisting of polymethylvinyl ketone and cyclohexanone.

According to an aspect of the present invention, the lithium salt may be at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (where p and q are natural numbers), LiCl and LiI.

According to another embodiment of the present invention, there is provided a lithium ion secondary battery, which comprises: a cathode including a cathode active material that can reversibly intercalate and deintercalate lithium ions; an anode including an anode active material that can reversibly intercalate and deintercalate lithium ions; and an electrolyte as described above according to aspects of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
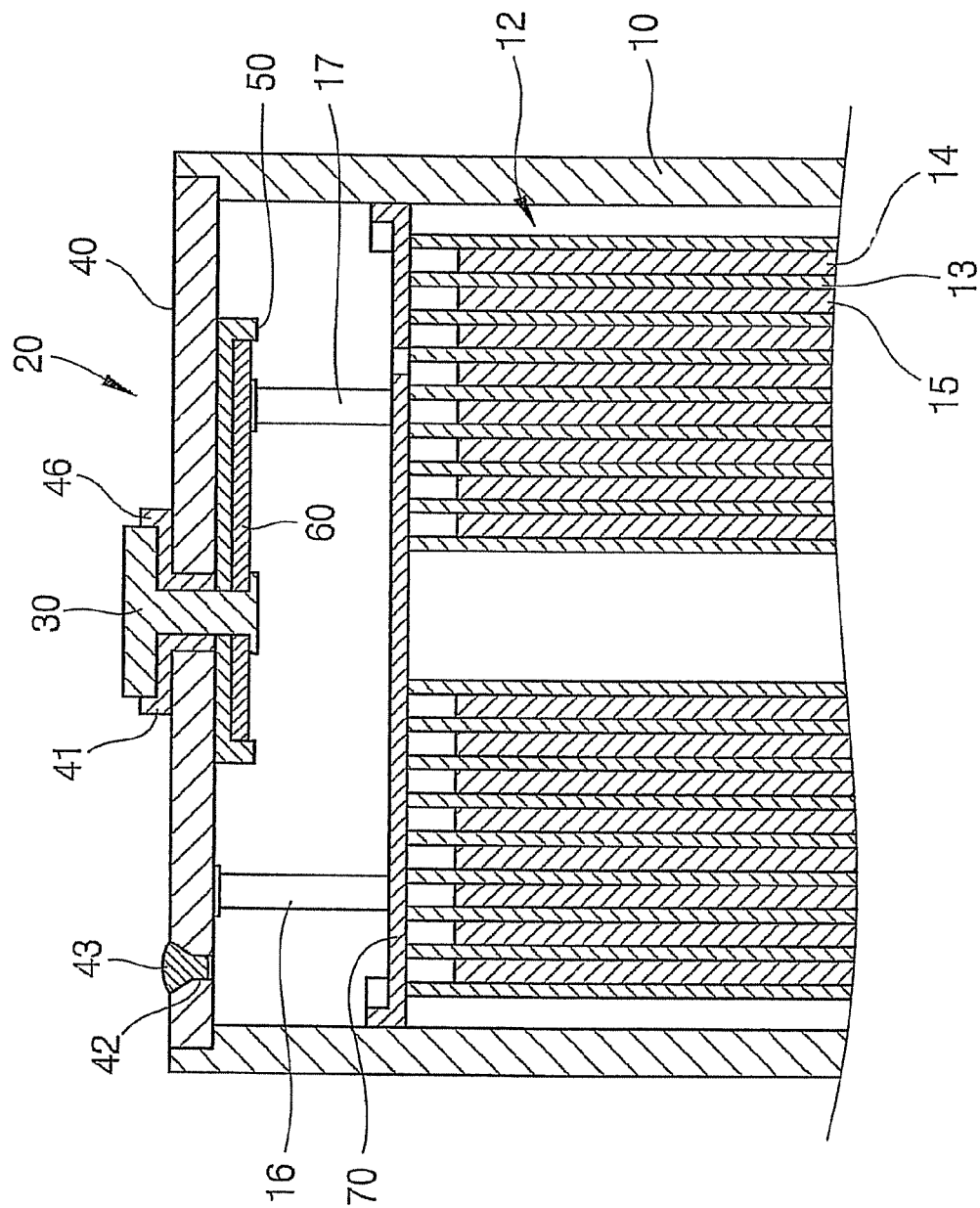
FIG. 1 is a view illustrating a rectangular type lithium ion secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An electrolyte according to aspects of the present invention includes a phosphonitrile fluoride trimer represented by a chemical formula 1 below as an additive:

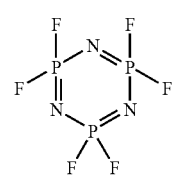

[Chemical formula 1]

The phosphonitrile fluoride trimer prevents loss of lithium caused by a reaction between lithium and electrolyte by forming a film having high thermal stability on an anode during charge. In addition, the phosphonitrile fluoride trimer prevents degradation of cycle characteristics of the battery and improves the thermal stability of the battery by inhibiting decomposition of the electrolyte.

The amount of the additive may be 0.1 to 5 parts by weight based on 100 parts by weight of the total electrolyte. When the content of the additive is less than the above range, improvement of the thermal stability and durability may be insufficient. On the other hand, when the content of the additive is more than the above range, the viscosity of the electrolyte may be increased, which may reduce the movement of lithium ions.

As an additional additive, the non-aqueous electrolyte may further include at least one selected from the group consisting of vinylene carbonate, propene sultone and an ethylene carbonate group compound represented by a chemical formula 2:

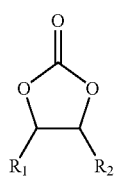

[Chemical formula 2]

In the above chemical formula, $R_1$ and $R_2$ are respectively selected from the group consisting of hydrogen, a halogen group, a cyano group (CN), a nitro group ($NO_2$), a vinyl group and a fluorinated alkyl group having 1 to 5 carbons, where $R_1$ and $R_2$ are not both hydrogen.

The ethylene carbonate group compound may typically include difluoroethylene carbonate, chloroethylene carbonate, dichloroethylene carbonate, bromoethylene carbonate, dibromoethylene carbonate, nitroethylene carbonate, cyanoethylene carbonate or fluoroethylene carbonate. As a specific, non-limiting example, the additional additive may be fluoroethylene carbonate. When the additive is used to improve the lifetime of the battery, the amount of the additional additive may be properly controlled.

The electrolyte also includes a non-aqueous organic solvent and a lithium salt. The non-aqueous organic solvent functions as a medium that transfers lithium ions that participate in the electrochemical reaction of the battery. The non-aqueous organic solvent may be at least one selected from the group consisting of a carbonate, an ester, an ether and a ketone.

The carbonate group solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC) or butylene carbonate (BC).

The ester group solvent may be n-methyl acetate, n-ethyl acetate, n-propyl acetate, dimethyl acetate, methyl propionate, ethyl propionate, γ-butyrolactone, decanolide, valerolactone, mevalonolactone or caprolactone.

The ether may be dibutyl ether, tetraglyme, diglyme, dimethoxy ethane, 2-methyltetrahydrofuran or tetrahydrofuran.

The ketone may be cyclohexanone or polymethylvinyl ketone.

The non-aqueous organic solvent may be used alone or a mixture of solvents may be used. When a mixture of organic solvent is used, the mixing ratio may be properly controlled according to the desired battery performance. An organic solvent having a high dielectric constant and a low viscosity may be used to transfer ions smoothly by improving the dissociation of ions. Generally, it is desirable to use a mixture of at least two solvents including a solvent having high dielectric constant and viscosity and a solvent having low dielectric constant and viscosity. It is desirable to use a mixture of a cyclic type carbonate and a chain type carbonate as the carbonate group solvent. It is further desirable that the mixing ratio of the cyclic type carbonate to the chain type carbonate be 1:1 to 1:9 in volume ratio to improve the performance of the electrolyte.

The non-aqueous organic solvent may further include an aromatic hydrocarbon group organic solvent in addition to the carbonate group organic solvent. An aromatic hydrocarbon compound having the following chemical formula 3 may be used as the aromatic hydrocarbon group organic solvent.

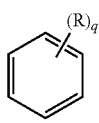

[Chemical formula 3]

In the above chemical formula, R is halogen or an alkyl group having 1 to 10 carbons and q is an integer of 0 to 6.

The aromatic hydrocarbon group organic solvent may be benzene, fluorobenzene, bromobenzene, chlorobenzene, toluene, xylene, or mesitylene or a mixture thereof. When the volume ratio of the carbonate solvent to the aromatic hydrocarbon group organic solvent is 1:1 to 30:1 in the electrolyte containing the aromatic hydrocarbon group organic solvent, generally desirable properties of the electrolyte such as stability, safety and ion conductivity are improved in comparison to compositions having other volume ratios.

The lithium salt functions as a source of lithium ions and enables basic operations of the lithium ion secondary battery and promotes movement of lithium ions between the cathode and anode. The lithium salt may be at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (p and q are natural numbers), LiCl and LiI. It is desirable to use a lithium salt that has a low lattice energy, high dissociation degree, excellent ion conductivity, thermal stability and oxidation resistance. In addition, it is desirable that the concentration of the lithium salt be in the range of 0.1 to 2.0M. When the concentration of the lithium salt is less than 0.1M, the conductivity of the electrolyte is decreased and thus, the performance thereof may be degraded. On the other hand, when the concentration of the lithium salt is more than 2.0M, the viscosity of the electrolyte is increased and thus, the movement of the lithium ions may be reduced.

The lithium ion secondary battery comprising the electrolyte includes a cathode, an anode and a separator.

The cathode includes a cathode active material that can reversibly intercalate and deintercalate lithium ions. As a non-limiting example, the cathode active material may be a composite metal oxide of lithium and at least one selected from cobalt, manganese and nickel.

The solid solubility of metals may be variously used in the composite metal oxide. In addition to these metals, any one selected from the group consisting of Mg, Al, Co, K, Na, Ca, Si, Ti, Sn, V, Ge, Ga, B, As, Zr, Mn, Cr, Fe, Sr, V and rare earth elements may be further included.

The anode includes an anode active material that can reversibly intercalate and deintercalate lithium ions. Crystalline or amorphous carbon, carbonic anode active material (thermally decomposed carbon, coke, graphite) such as a carbon composite, combusted organic polymer, carbon fiber, tin oxide, lithium metal or an alloy of lithium and another element may be used as the anode active material. For example, the amorphous carbon may be hard carbon, coke, mesocarbon microbeads (MCMB) calcinated below 1500° C., mesophase pitch-based carbon fiber (MPCF), etc. The crystalline carbon may be a graphite material, more particularly, natural graphite, graphitized cokes, graphitized MCMB, or graphitized MPCF, etc.

The anode and cathode may be made by preparing an electrode slurry composition by dispersing the electrode active material, a binder, a conductive material and a thickener, if desired, in a solvent and coating the slurry composition on an electrode collector. As non-limiting examples, aluminum or aluminum alloy may be used as a cathode collector and copper or copper alloy may be used as an anode collector. The anode and cathode collectors may be formed as a foil or mesh.

The lithium secondary battery includes a separator that prevents a short between the cathode and anode. As non-limiting examples, a polymer membrane such as a polyolefin, polypropylene, or polyethylene membrane, a multi-membrane thereof, a micro-porous film, or a woven or non-woven fabric may be used as the separator.

A unit battery having a structure of cathode/separator/anode, a bi-cell having a structure of cathode/separator/anode/separator/cathode, or a battery stack including a plurality of unit batteries may be formed using the above-described lithium secondary battery including the electrolyte, cathode, anode and separator.

A typical lithium secondary battery having the above construction is shown in FIG. 1. Referring to FIG. 1, the lithium secondary battery is formed of an electrode assembly 12 including a cathode 13, an anode 15 and a separator 14, a can 10 receiving the electrode assembly and electrolyte, and a cap assembly 20 sealing an upper part of the can 10. The cap assembly 20 includes a cap plate 40, an insulation plate 50, a terminal plate 60 and an electrode terminal 30. The cap assembly 20 is combined with an insulation case 70 to seal the can 10.

The electrode terminal 30 is inserted into a terminal hole 41 formed at the middle of the cap plate 40. When the electrode terminal 30 is inserted into the terminal hole 41, a tubular gasket 46 combined with an outer surface of the electrode terminal 30 is inserted into the terminal hole 41 to insulate the electrode terminal 30 from the cap plate 40. After the cap assembly 20 is fastened onto the upper part of the can 10, the electrolyte is injected through an electrolyte injection hole 42 and then the electrolyte injection hole 42 is sealed by a stopper 43. The electrode terminal 30 is connected to an anode tab 17 of the anode or a cathode tab 16 of the cathode to function as an anode terminal or a cathode terminal.

The lithium secondary battery may be formed in various types such as cylindrical and pouch types in addition to the rectangular type.

Embodiments of the present invention and comparison examples will be explained below, but the present invention is not limited thereto.

Embodiment 1

A cathode active material slurry was prepared by dispersing $LiCoO_2$ as a cathode active material, polyvinylidene fluoride (PVdF) as a binder, and carbon as a conductive material in an N-methyl-2-pyrrolidone (NMP) solvent at a weight ratio of 92:4:4. Then a cathode was formed by coating the cathode active material slurry onto an aluminum foil having a thickness of 15 μm, and then drying and rolling the coated foil. The anode active material slurry was prepared by mixing artificial graphite as an anode active material, styrene-butadiene rubber as a binder, and carboxymethylcelluose as a thickener at a weight ratio of 96:2:2, then dispersing the mixture in water. Then, an anode was formed by coating the slurry onto a copper foil having a thickness of 10 μm, and drying and rolling the coated foil. Next, after a polyethylene separator having a thickness of 10 μm was interposed between the above electrodes to form an electrode assembly, the electrode assembly was wound and pressurized. Then, the electrode assembly was inserted into a rectangular can having a size of 46 mm by 34 mm by 50 mm. Then, the electrolyte described below was injected into the can, thereby completing a lithium secondary battery.

The electrolyte was prepared by adding LiPF6 in a mixture solvent of ethylene carbonate, ethylmethyl carbonate and diethyl carbonate (the volume ratio was 1:1:1) and adding the phosphonitrile fluoride trimer, where the concentration of $LiPF_6$ was 1.0M. The added amount of the phosphonitrile fluoride trimer was 1 part by weight based on 100 parts by weight of the total electrolyte.

Embodiment 2

This embodiment was carried out in the same manner as Embodiment 1, except that the amount of the phosphonitrile fluoride trimer was 2 parts by weight.

Embodiment 3

This embodiment was carried out in the same manner as Embodiment 1, except that the amount of the phosphonitrile fluoride trimer was 3 parts by weight.

Embodiment 4

This embodiment was carried out in the same manner as Embodiment 1, except that the amount of the phosphonitrile fluoride trimer was 2 parts by weight, and fluoroethylene carbonate (FEC) in the amount of 2 parts by weight was added.

Comparison Example 1

This comparison example was carried out in the same manner as Embodiment 1 except that the phosphonitrile fluoride trimer was not added.

The capacity and capacity retention ratios according to the repetition of charge/discharge cycles were measured for the batteries manufactured in the embodiments and comparison example and thickness increase rate was measured after the batteries had been left for 7 days at 60° C. Thus, the positive effect of the phosphonitrile fluoride trimer on the lifetime and thermal stability of the battery was confirmed.

Experimental Example 1

Lifetime Test

Figure 2:
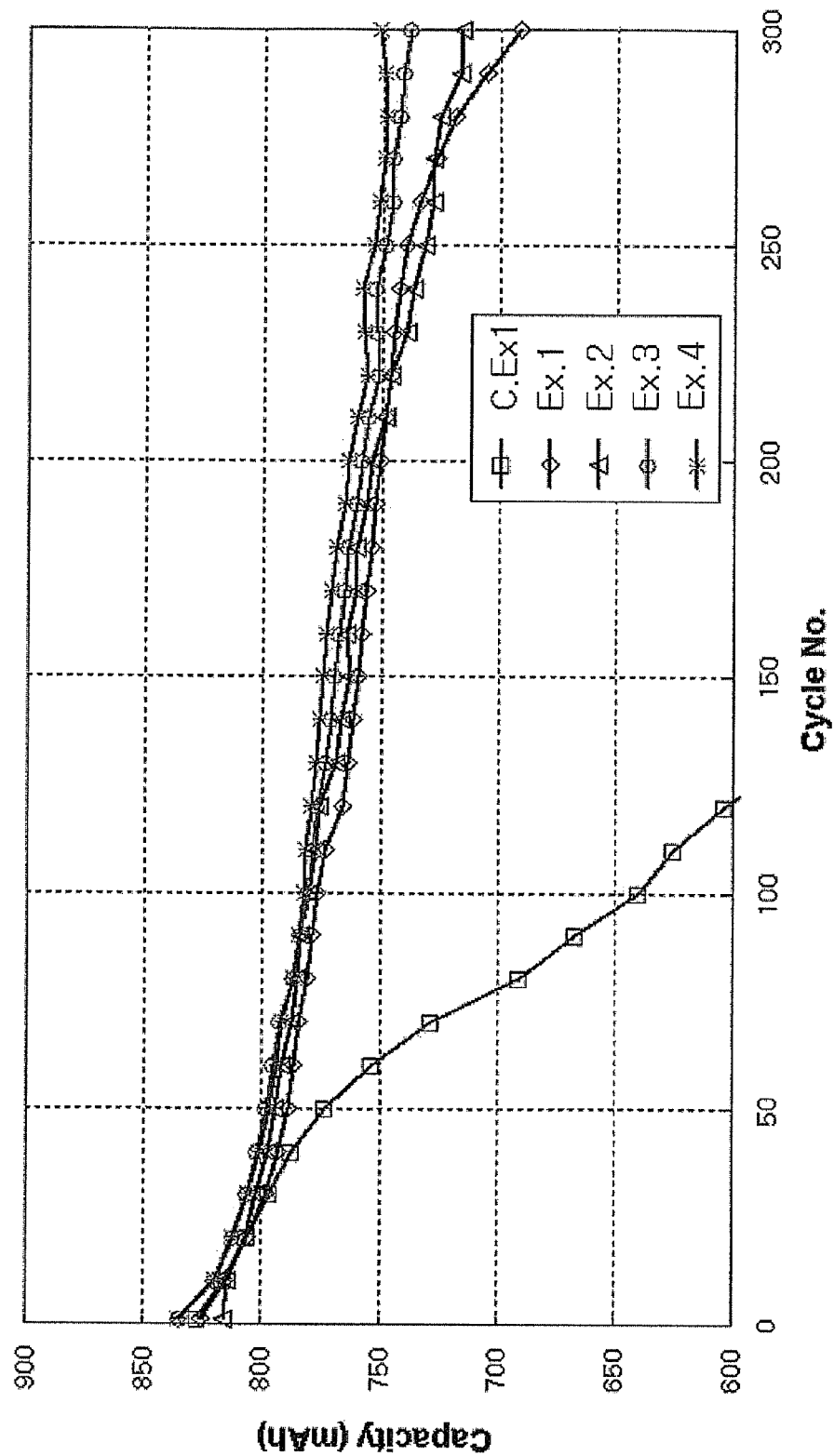
FIG. 2 is a graph illustrating discharge capacity relative to the number of charge/discharge cycle according to the embodiments of the present invention and comparison examples.
Figure 3:
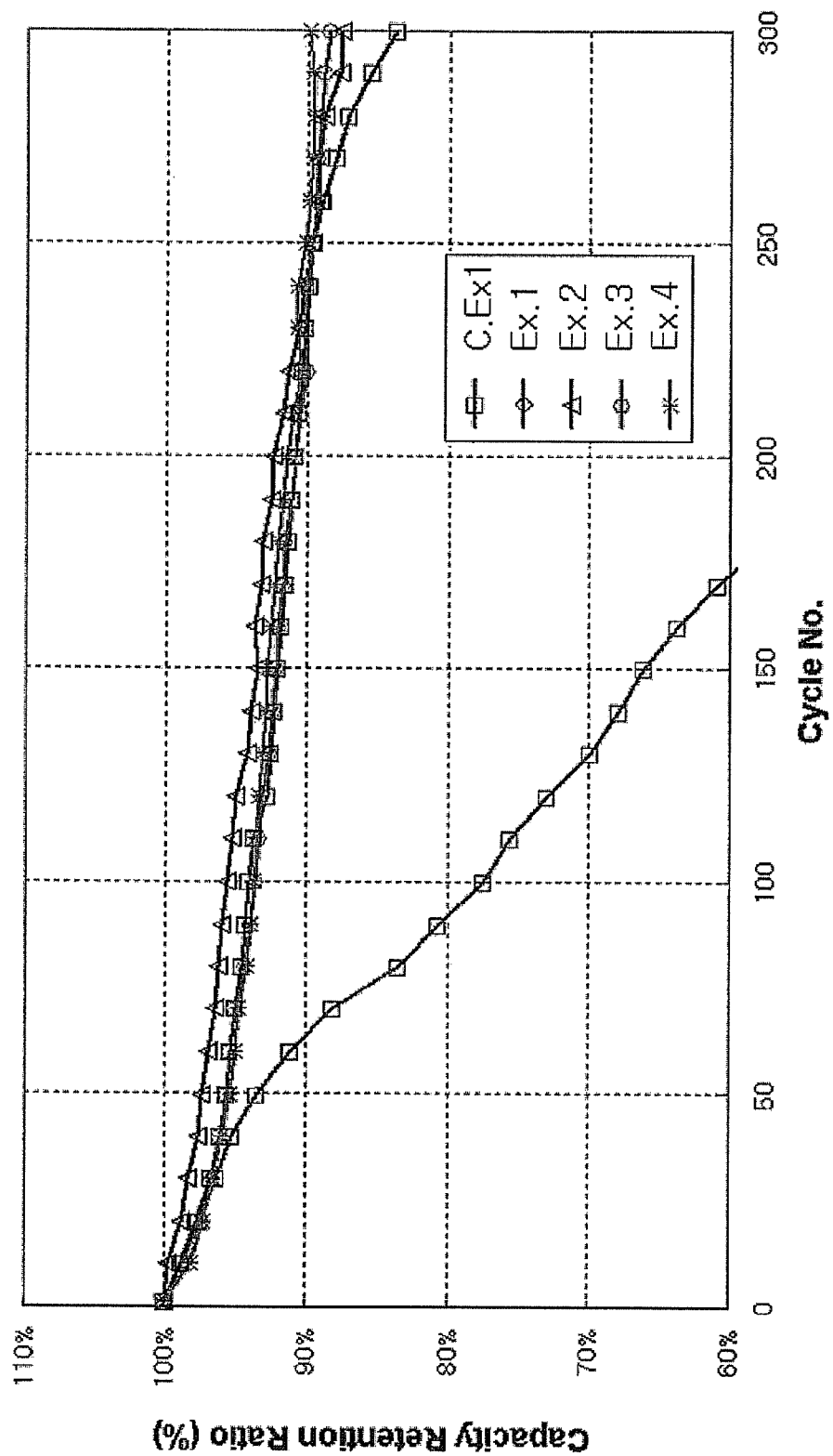
FIG. 3 is a graph illustrating capacity retention ratio relative to the number of charge/discharge cycle according to the embodiments of the present invention and comparison examples

The batteries manufactured in Embodiments 1 to 4 and Comparison Example 1 were charged with a constant current of 1 C until their voltages reached to 4.2V, after that charged with a constant voltage of 4.2V at a room temperature until total charging time reached to 3 hrs, and then discharged with a constant current of 1 C until their voltages reached to 3.0V. Wherein C is a unit of 'c-rate' and 'c-rate' is a charge or discharge current rate of battery expressed in amperes. The charge/discharge was performed for 100, 200 and 300 cycles respectively. Then, discharge capacities were measured and the results are shown in FIG. 2. The capacity retention ratios (%) corresponding to the cycles were calculated as below, and the results are shown in FIG. 3 and Table 1.

Capacity retention ratio (%) of the corresponding cycle=(discharging capacity of the corresponding cycle/discharging capacity of the first cycle)*100 (%)

Experimental Example 2

Thermal Stability Test

The batteries manufactured in Embodiments 1 to 4 and Comparison Example 1 were left for 7 days at 60° C. Then, thickness increase rates were measured and the results were shown in Table 1.

A: initial thickness

B: thickness after the battery was left for 7 days at 60° C.

thickness increase rate (%)=(B−A)/A

TABLE 1

| | phosphonitrile fluoride trimer (parts by weight) | Fluoroethylene carbonate (parts by weight) | Capacity retention ratio (%) after 300 charge/discharge cycles | thickness increase rate (%) after the battery was left for 7 days at 60° C. |
|---|---|---|---|---|
| Embodiment 1 | 1 | — | 84 | 9.5 |
| Embodiment 2 | 2 | — | 88 | 8.1 |
| Embodiment 3 | 3 | — | 89 | 6.2 |
| Embodiment 4 | 2 | 2 | 90 | 8.3 |
| Comparison example 1 | — | — | 7 | 17.0 |

As shown in Table 1, FIGS. 2 and 3, when the phosphonitrile fluoride trimer of 0.1 to 5 wt % was added, the discharge capacity and capacity retention ratio after 300 charge/discharge cycles, that is, the lifetimes of the batteries, were improved compared to Comparison Example 1. In addition, when an ethylene carbonate group additive such as FEC was added with the phosphonitrile fluoride trimer, the lifetime was even more improved.

Referring to Table 1, in Embodiments 1 to 4, the thickness increase rate (%) after the battery was left for 7 days at 60° C. was lower than in the Comparison Example 1. Thus, the thermal stability was also improved.

As described above, the lithium secondary battery comprising the electrolyte according to aspects of the present invention produces the effect that the thickness increase rate of the battery is reduced even when the battery is kept at a high temperature. Thus, thermal stability and durability of the battery are prominently improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium ion secondary battery comprising:
   a non-aqueous organic solvent;
   lithium salt; and
   a phosphonitrile fluoride trimer represented by a chemical formula 1 below as an additive:

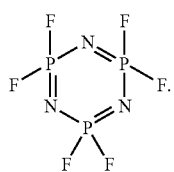

[Chemical formula 1]

wherein the amount of the phosphonitrile fluoride trimer of the chemical formula 1 is 0.1 to 1 parts by weight based on 100 parts by weight of the total electrolyte,
   wherein the non-aqueous organic solvent comprises at least one selected from the group consisting of a carbonate, an ester, an ether and a ketone,
   wherein the non-aqueous organic solvent further comprises at least one of benzene, fluorobenzene, bromobenzene, chlorobenzene, toluene, xylene, mesitylene or a mixture thereof, and
   wherein the electrolyte further comprises at least one selected from the group consisting of vinylene carbonate, propene sultone and an ethylene carbonate group compound represented by a chemical formula 2:

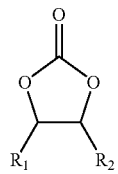

[Chemical formula 2]

where $R_1$ and $R_2$ are respectively selected from the group consisting of hydrogen, a halogen group, a cyano group (CN), a nitro group ($NO_2$), a vinyl group and a fluorinated alkyl group having 1 to 5 carbons, where $R_1$ and $R_2$ are not both hydrogen.

2. The electrolyte of claim 1, wherein the ethylene carbonate group compound is fluoroethylene carbonate.

3. The electrolyte of claim 1, wherein the carbonate is at least one selected from the group of dimethyl carbonate, diethyl carbonate, dipropyl carbonate, methylpropyl carbonate, ethylpropyl carbonate, ethylmethyl carbonate, ethylene carbonate, propylene carbonate, butylene carbonate and pentylene carbonate.

4. The electrolyte of claim 1, wherein the ester is at least one selected from the group consisting of n-methyl acetate, n-ethyl acetate, n-propyl acetate, dimethyl acetate, methyl propionate, ethyl propionate, y-butyrolactone, decanolide, valerolactone, mevalonolactone and caprolactone.

5. The electrolyte of claim 1, wherein the ether is at least one selected from the group consisting of dibutyl ether, tetraglyme, diglyme, dimethoxy ethane, 2-methyltetrahydrofuran and tetrahydrofuran.

6. The electrolyte of claim 1, wherein the ketone is at least one selected from the group consisting of polymethylvinyl ketone and cyclohexanone.

7. The electrolyte of claim 1, wherein the lithium salt is at least one selected from the group consisting of $LiPF_6$, $LiBF_4$, $LiSbF_6$, $LiAsF_6$, $LiClO_4$, $LiCF_3SO_3$, $LiC_4F_9SO_3$, $LiAlO_4$, $LiAlCl_4$, $LiN(C_pF_{2p+1}SO_2)(C_qF_{2q+1}SO_2)$ (where p and q are natural numbers), LiCl and LiI.

8. A lithium ion secondary battery, comprising:
   a cathode including a cathode active material that can reversibly intercalate and deintercalate lithium;
   an anode including an anode active material that can reversibly intercalate and deintercalate lithium; and
   the electrolyte of claim 1.

9. A lithium ion secondary battery, comprising:
   a cathode including a cathode active material that can reversibly intercalate and deintercalate lithium;
   an anode including an anode active material that can reversibly intercalate and deintercalate lithium; and
   the electrolyte of claim 2.

10. A lithium ion secondary battery, comprising:
    a cathode including a cathode active material that can reversibly intercalate and deintercalate lithium;
    an anode including an anode active material that can reversibly intercalate and deintercalate lithium; and
    the electrolyte of claim 3.

11. A lithium ion secondary battery, comprising:
    a cathode including a cathode active material that can reversibly intercalate and deintercalate lithium;

an anode including an anode active material that can reversibly intercalate and deintercalate lithium; and the electrolyte of claim 4.

12. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 5.

13. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 6.

14. A lithium ion secondary battery, comprising:

a cathode including a cathode active material that can reversibly intercalate and deintercalate lithium;

an anode including an anode active material that can reversibly intercalate and deintercalate lithium; and the electrolyte of claim 7.

* * * * *

UNITED STATES PATENT AND TRADEMARK OFFICE
CERTIFICATE OF CORRECTION

PATENT NO. : 8,771,881 B2  Page 1 of 1
APPLICATION NO. : 12/255799
DATED : July 8, 2014
INVENTOR(S) : Jinsung Kim et al.

It is certified that error appears in the above-identified patent and that said Letters Patent is hereby corrected as shown below:

| Column | Line | |
|---|---|---|
| Title Page Priority Number | N/A | Change "2008-47026" to --10-2008-0047026-- |

In the Claims 9    50-55    In Claim 1, change

"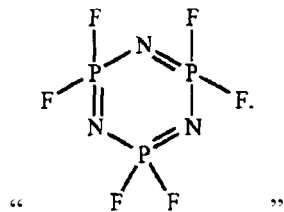"

to -- 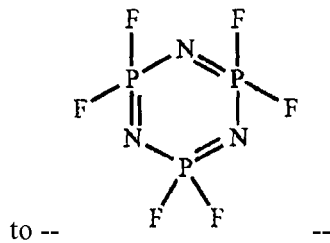 --

Signed and Sealed this
Second Day of June, 2015

Michelle K. Lee
*Director of the United States Patent and Trademark Office*